United States Patent Office 3,647,601
Patented Mar. 7, 1972

3,647,601
APPARATUS FOR THE AUTOGENOUS BONDING OF CONTRACEPTIVE SHEATHS
Francis Douglas Berry, Theydon Bois, and Stanley Charles Blyther, North Weald, England, assignors to LR Industries Limited, London, England
Filed Nov. 12, 1969, Ser. No. 875,894
Claims priority, application Great Britain, Aug. 17, 1969, 41,323/69
Int. Cl. B32b *31/18*
U.S. Cl. 156—511          6 Claims

ABSTRACT OF THE DISCLOSURE

Contraceptive sheaths are made from thermoplastic film material by forming two substantially identical blanks each corresponding in shape to the shape of the required sheath and welding the edges of the blanks together except at the intended open end of the sheath.

---

This invention relates to the manufacture of contraceptive sheaths from synthetic thermoplastic film material.

Contraceptive sheaths made from synthetic plastics film material are described in our copending application No. 20,992/68 which application includes a specific description of contraceptive sheaths made from thermoplastics. The present invention is concerned with the manufacture, particularly by mass production, of such contraceptive sheaths.

According to the invention in one aspect there is provided a method of manufacturing a contraceptive sheath from synthetic thermoplastic film material comprising cutting two substantially identical blanks, each corresponding in shape to the shape of the required sheath, from said film material, bringing said blanks together with their edge portions in mutual engagement except at one end corresponding to the open end of the sheath, and welding the engaged edge portions together to form a sheath having a welded seam.

The seam formed by welding may be formed by the welding together of outwardly projecting overlying edge portions which are subsequently treated to form a smooth outer surface. Preferably, however, one edge portion of each of said abutting pairs is disposed externally of the formed sheath and the other is disposed within the sheath, so that, upon welding the overlapping portions together the resulting seam is substantially flush with the body of the sheath.

In another aspect the invention provides apparatus for use in manufacturing a contraceptive sheath, comprising means for cutting from synthetic thermoplastic film material respective substantially identical blanks, respective supports for holding said blanks with edge portions projecting from the supports, means for bringing the supports into juxtaposition so that the projecting edge portions of said blanks engage each other and edge seam welding means for welding together the engaged edge portions to form a welded seam.

Where, as in the preferred embodiment of the invention, a flush edge seam is to be formed the apparatus preferably includes a mandrel adapted to be located between the juxtaposed blanks, the edge seam welding means including respective welding members which press overlapping edge portions together on the mandrel to form a seam which is substantially flush with the body of the resulting sheath.

Apparatus according to the invention is readily adapted for mass production of sheaths. In one embodiment of the invention the respective blanks are cut from successive areas of respective webs of thermoplastic film and transferred to the respective supports, the supports, with the blanks thereon, being subsequently advanced to a station at which they are brought into juxtaposition to bring projecting edge portions of the blanks into abutting relationship.

The supports may be arranged for movement in sequence along respective closed paths including said station, or, for example, may be carried by respective rotatable turrets which are indexed in unison with each other to bring these supports into juxtaposition at said station.

In a preferred embodiment of the invention each support is provided with a recess conforming in shape to the body shape of the sheath, and the edge portions of the respective blank are held securely at the edges of this recess, for example by means of suction; the remainder of the blank is pushed or drawn at least partially into this recess and the edge portions subsequently released so as to cause the latter to project outwardly from the respective support. For example, a shaped mandrel may be inserted partly into said recess.

Alternatively, the respective recesses in the supports may be brought into face-to-face alignment at said welding station, with the respective blanks drawn at least partly into said recesses; a movable mandrel is then introduced into the space defined between the aligned recesses so as to be enveloped by the two blanks.

The invention will be described, merely by way of example, with reference to the accompanying drawings, in which.

Figure 1:
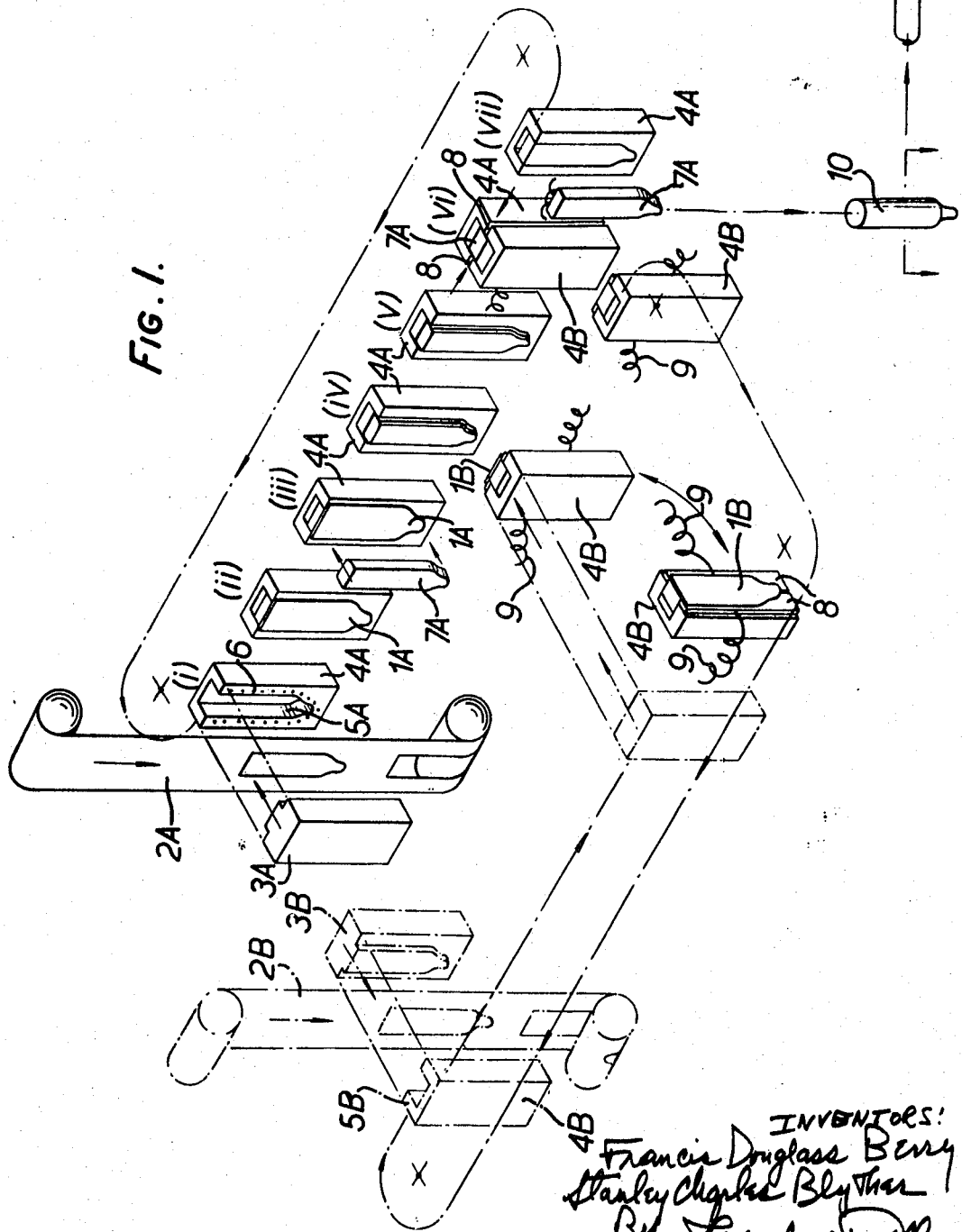
FIG. 1 is a purely diagrammatic view illustrating the general arrangement of an apparatus according to one embodiment of the invention for forming contraceptive sheaths from thermoplastic film material.

Referring first to FIG. 1, a contraceptive sheath is formed from two substantially identical blanks 1A, 1B cut from respective continuous webs 2A, 2B of thermoplastic film material supplied from respective reels 3A, 3B.

The blanks 1A, 1B are cut or stamped from the respective webs 2A, 2B by respective reciprocating cutters 3A, 3B which simultaneously with cutting the blanks from the respective webs, transfer the blanks to respective supports 4A, 4B disposed at respective receiving stations (i).

The respective supports 4A, 4B are provided with respective recesses 5A, 5B conforming in shape to the body shape of the sheath to be formed, the recesses 5A, 5B being bounded by plane surfaces on the respective supports 4A, 4B which receive the edge portions of the respective blanks 1A, 1B. The edge portions of said blanks are retained on these plane surfaces by suction applied to apertures 6 in said surface, as shown at (i) in FIG. 1, where the respective blank is omitted for the sake of clarity.

The supports 4A, 4B are mounted on respective conveyors which carry a number of said supports at equal intervals and which are arranged to move the supports intermittently by amounts equal to the distance therebetween around respective closed paths, as indicated in broken outline in FIG. 1.

Seven successive stations for the support 4A on its respective conveyor are shown diagrammatically at (i)–(vii) in FIG. 1, it being understood that corresponding positions exist for the support 4B, respective opposite pairs of supports 4A, 4B being moved in unison on their respective conveyors.

The support 4A is shown at station (ii) with the respective blank 1A securely seated thereon along its edges by suction applied to the apertures 6. At station (iii) the support 4A is located opposite a respective mandrel 7A which also has a shape conforming to the general profile of the body of the required sheath. The mandrel 7A is moved towards the support 4A and partly enters the respective recess 5A so that it deforms the blank 1A, causing the edge of the blank to project from the flat surface of the support 3A, as shown at station (iv), the suction at the apertures 6 being at this stage discontinued. In consequence, the edge portions of the blank 1A lie flat along the edge surfaces of the blank 7A.

The blank 1B on the support 4B has in the meantime been advancing through a similar series of stations, but without any engagement of the blank by a mandrel. Thus the blank 1B remains held on the flat surface of the support 4B in a flat state.

When both supports 4A, 4B reach the station (v) the respective recesses 5A, 5B face each other. The respective conveyor paths then take the supports 4A, 4B into juxtaposition with each other, as illustrated at station (vi) so that the blank 1B held on the support 4B is laid on the exposed surface of the mandrel 7A. The mandrel 7A is, therefore, in effect enclosed by the two blanks 1A, 1B.

The support 4B carries at its supporting face a pair of profiled welding tools 8, as indicated diagrammatically in FIG. 1, to which an electric heating current is supplied by way of leads 9. The tools 8 are advanced towards each other when the supports 4A, 4B are in juxtaposition (vi) to cause the edge portions of the blank 1B to be folded over on to the edge portions of the blank 1A, overlapping the latter on the edge surfaces of the mandrel 7A. Welding current is then passed through the tools 8 to weld the overlapping edge portions and to form a substantially flat edge seam, as shown diagrammatically in FIG. 4(b).

When the welding has been completed the supports 4A, 4B are separated, and the formed sheath 10 is removed from the mandrel 7A, as shown diagrammatically at station (vii).

The apparatus of FIG. 1 can be arranged to operate in an automatic sequence, the advance of the webs 2A, 2B from which the blanks 1A, 1B are formed being synchronised with the advancing movements of the supports 4A, 4B on the respective conveyors and movements of the cutters 3A,3B and the mandrel 7A.

Figure 2:
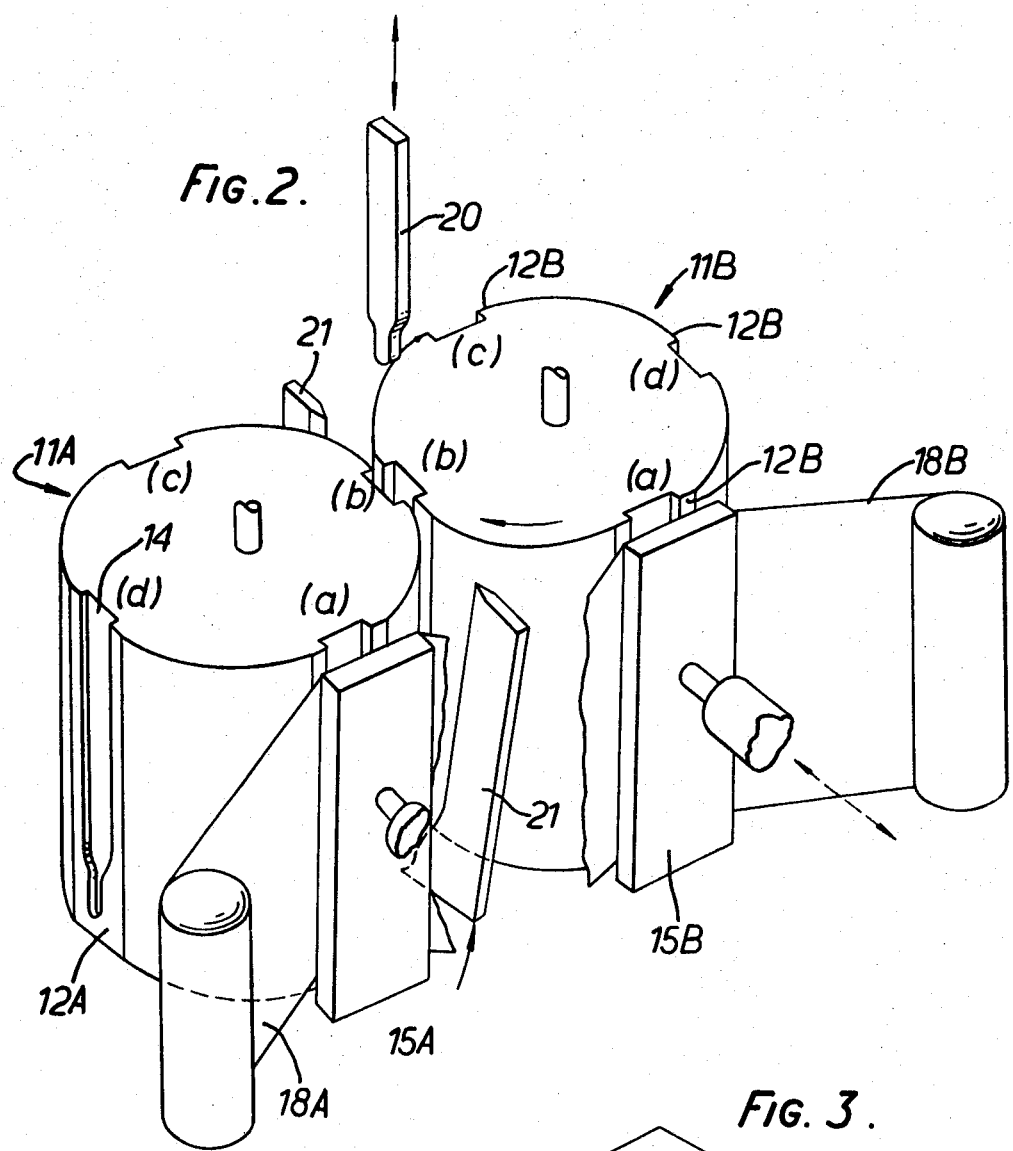
FIG. 2 is a purely diagrammatic illustration of an apparatus according to an alternative embodiment of the invention.

The sequence of operations illustrated diagrammatically in FIG. 1 can conveniently be effected on two rotary co-operating turrets, rather than two conveyors. Apparatus employing two rotary turrets 11A, 11B is shown diagrammatically in FIG. 2.

The turrets 11A, 11B are arranged for rotation in the directions indicated by the arrows intermittently and in unison.

The external surfaces of the turrets 11A, 11B are provided with respective supporting surfaces 12A, 12B at equal angular intervals: in the illustrated example four such surfaces 12 are provided on each turret 11 at intervals of 90°. Each supporting surface 12 is formed with a recess 14 conforming to the shape of the required sheath, the purpose of which is similar to that of the recesses 5 provided in the supports 4 of the embodiment previously described with reference to FIG. 1.

The turrets 11A, 11B are rotated intermittently through successive angles of 90° so that the supporting surfaces 12 are moved successively through four stations (a)–(d).

Figure 3:
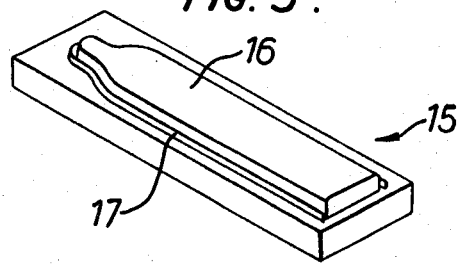
FIG. 3 is a perspective view of one of the cutter elements employed in the apparatus of FIG. 2.

A cutting tool 15 is arranged at each station (a) and is mounted for reciprocation radially towards and away from the respective turrets 11A, 11B. One of the tools 15 is shown in FIG. 3 and is seen to comprise a generally flat plate having a raised form 16 on its side facing towards the respective turret 11, said form 16 being spring biassed towards the respective turret. Outwardly of the form 16 the tool 15 is provided with a profiled knife edge 17.

A respective web of thermoplastic film 18 is fed, by any convenient means, between each respective tool 15A and the respective turret 11A, as shown diagrammatically. Each tool 15A, 15B is advanced towards the turrets 11A, 11B at the station (a) to cut a respective blank (not shown) from the respective webs 18A, 18B, the respective spring-loaded form 16A, 16B pressing the blank so formed into respective recesses 14A, 14B at the station (a), the edges of the blank being received on the flat surfaces surrounding the respetcive recesses 14A, 14B.

Upon subsequent indexing of the turrets 11A, 11B the recesses 14A, 14B carrying the respective blanks are advanced to the stations (b) where the recesses face each other. A vertically displaceable mandrel 20 is then advanced into the space defined between the facing recesses 14A, 14B so as to be interposed between the respective blanks.

Figure 4:
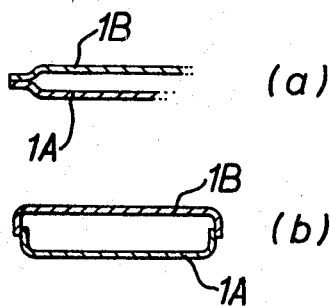
FIG. 4 illustrates diagrammatically in cross section contraceptive sheaths having different types of welded seam, formed by the method of the present invention.

Two welding tools 21 located on opposite sides of the stations (b) are then moved towards each other to engage the edge portions of the respective blanks and cause them to overlap on the respective opposite edge surfaces of the mandrel 20, being simultaneously welded together to form respective flush seams, as illustrated in FIG. 4(b). The welding tools 21 in this embodiment may be pivoted together directly beneath the mandrel 20 on the side of the turrets 11A, 11B opposite the mandrel 20 so that the tools 21 engage the overlapping edge portions of the blanks initially at the lowermost parts thereof, corresponding to the closed end of the eventual sheath.

As an alternative to forming overlapping edge portions which are subsequently welded together to form lap welds or substantially flush edge seams, the edge portions of the two blanks from which each sheath is formed may be placed in overlying contact face to face to form raised edge seams, as illustrated diagrammatically in FIG. 4(a), which may require subsequent smoothing-off.

Examples of suitable synthetic thermoplastic materials from which the films supplying the respective blanks may be formed ar polyolefines, in particular polyethylene, polypropylene or ethylene-propylene copolymers, polyvinyl chloride, polyvinylidene chloride, polyesters in particular polyethylene terephthalate ("Mylar") (registered trademark), polyamides in particular "Nylon," (registered trademark) and polycarbonates, in particular "Makrolon" (registered trademark).

We claim:

1. Apparatus for use in manufacturing a contraceptive sheath, comprising means for forming from thermoplastic film material respective substantially identical blanks, respective supports for holding said blanks with edge portions projecting from said supports, means for bringing said supports into juxtaposition so that the projecting edge portions of said blanks are in mutual engagement, edge seam welding means for welding together the engaging edge portions to form a welded seam, means for cutting the respective blanks from successive areas of respective webs of thermoplastic film material, means for transferring the cut blanks to their respective supports, and means for advancing the respective supports with the blanks thereon along respective closed paths to a welding station included in said paths.

2. Apparatus according to claim 1 comprising a mandrel, means for locating the mandrel between the juxtaposed blanks and edge welding member adapted to press overlapping edge portions of the blanks together on said mandrel to form a seam which is substantially flush with the body of the resulting sheath.

3. Apparatus according to claim 1 comprising means for cutting the respective blanks from successive areas of respective webs of thermoplastic film material, means for transferring the cut blanks to their respective supports and means for advancing the respective supports with blanks thereon to a welding station where the projecting edge portions are in mutual engagement.

4. Apparatus according to claim 1 comprising means for cutting the respective blanks from successive areas of respective webs of thermoplastic film material, rotatable turrets carrying the respective supports, means for transferring the cut blanks to their respective supports, and means for indexing said turrets in unison with each other to bring the supports into juxtaposition at a welding station where the projecting edge portions are in mutual engagement.

5. Apparatus according to claim 1 comprising supports each provided with a recess conforming in shape to the body shape of the sheath, means for bringing the respective recesses in the supports into face-to-face alignment at the welding station, a mandrel, and means for introducing the mandrel into the space defined between the aligned recesses so as to be enveloped by the blanks.

6. Apparatus for use in manufacturing a contraceptive sheath, comprising means for forming from thermoplastic film material respective substantially identical blanks, respective supports for holding said blanks with edge portions projecting from said supports, means for bringing said supports into juxtaposition so that the projecting edge portions of said blanks are in mutual engagement, edge seam welding means for welding together the engaging edge portions to form a welded seam, a support provided with a recess conforming in shape to the body shape of the sheath and suction means for releasably securing the edge portions of the respective blank to the edge of the recess.

References Cited

UNITED STATES PATENTS

| | | | |
|---|---|---|---|
| 1,481,866 | 1/1924 | Heist | 156—445 X |
| 3,028,576 | 4/1962 | Gerard | 156—251 |
| 3,189,505 | 6/1965 | Sloan et al. | 156—552 X |
| 3,198,685 | 8/1965 | Kopito et al. | 156—251 X |
| 3,359,150 | 12/1967 | Stoothoff et al. | 156—517 X |

BENJAMIN A. BORCHELT, Primary Examiner

D. A. BENT, Assistant Examiner

U.S. Cl. X.R.

156—251, 267, 306